US006167147A

United States Patent [19]

Mowry, Jr. et al.

[11] Patent Number: 6,167,147

[45] Date of Patent: Dec. 26, 2000

[54] SECURITY DOCUMENT INCLUDING PSEUDO-RANDOM IMAGE AND METHOD OF MAKING THE SAME

[75] Inventors: William H. Mowry, Jr., Dayton; Albert J. Fledderman, Piqua, both of Ohio

[73] Assignee: The Standard Register Company, Dayton, Ohio

[21] Appl. No.: 09/179,145

[22] Filed: Oct. 26, 1998

[51] Int. Cl.[7] .......... G06K 9/00

[52] U.S. Cl. .......... 382/135; 283/73; 283/93; 283/901; 283/902; 382/137

[58] Field of Search .......... 382/135, 137; 283/73, 93, 901, 902; 213/93

[56] References Cited

U.S. PATENT DOCUMENTS

| | | | |
|---|---|---|---|
| 4,420,175 | 12/1983 | Mowry, Jr. | 283/93 |
| 4,579,370 | 4/1986 | Corwin et al. | 283/72 |
| 5,097,517 | 3/1992 | Holt | 382/7 |
| 5,149,140 | 9/1992 | Mowry, Jr. et al. | 283/93 |
| 5,197,765 | 3/1993 | Mowry, Jr. et al. | 283/93 |
| 5,291,243 | 3/1994 | Heckman et al. . | |
| 5,340,159 | 8/1994 | Mowry, Jr. | 283/93 |
| 5,367,319 | 11/1994 | Graham . | |
| 5,499,305 | 3/1996 | Lidke et al. | 382/270 |
| 5,521,722 | 5/1996 | Colvill et al. | 358/500 |
| 5,555,475 | 9/1996 | Perowne et al. | 358/462 |
| 5,640,254 | 6/1997 | Sexton | 358/536 |
| 5,673,121 | 9/1997 | Wang | 358/456 |
| 5,677,093 | 10/1997 | Delabastita et al. | 430/30 |
| 5,790,697 | 8/1998 | Munro et al. | 382/135 |
| 5,951,055 | 9/1999 | Mowry, Jr. | 283/93 |
| 5,954,368 | 12/1999 | Mowry, Jr. | 213/93 |

FOREIGN PATENT DOCUMENTS

WO 98/22292 5/1998 WIPO .

*Primary Examiner*—Joseph Mancuso
*Assistant Examiner*—Abolfazl Tabatabai
*Attorney, Agent, or Firm*—Killworth, Gottman, Hagan & Schaeff, LLP

[57] ABSTRACT

A security document is provided comprising: a security image area on the face of the document and a printed security image within the security image area. At least a portion of the security image area is divided into a plurality of image element cells, such that the image element cells define an array of image element cells across the security image area. Each of the image element cells is divided into a plurality of pixels, such that each image element cell defines a cell pixel array. At least a portion of the security image area is divided into a plurality of complementary image element cells, such that the complementary image element cells define an array of complementary image element cells across the security image area. Each of the complementary image element cells is divided into a plurality of pixels, such that each complementary image element cell defines a cell pixel array. The printed security image comprises image elements and complementary image elements. The image elements are positioned uniformly with respect to the array of image element cells and substantially randomly with respect to the pixels within each of the image element cells. The complementary image elements are positioned uniformly with respect to the array of complementary image element cells and substantially randomly with respect to the pixels within each of the complementary image element cells.

48 Claims, 5 Drawing Sheets

Microfiche Appendix Included
(1 Microfiche, 47 Pages)

SECURITY DOCUMENT INCLUDING PSEUDO-RANDOM IMAGE AND METHOD OF MAKING THE SAME

Reference is made to a Microfiche Appendix hereto, having a total of one microfiche and a total of 47 frames.

BACKGROUND OF THE INVENTION

The present invention relates to security documents including a security image composed of individual security image elements and complementary security image elements. When an attempt is made to duplicate a document on which the security image is present, at least some of the security image elements change their appearance on the intended duplicate document, or are altered with respect to some other physical characteristic on the intended duplicate document. The change in appearance, or the altered physical characteristic, of the elements provides an indication that an attempt has been made to duplicate the document.

For example, the security image elements and the complementary security image elements may be designed such that, upon the attempted duplication or reproduction, e.g., by photocopying, either the security image elements or the complementary security image elements are altered while the others remain substantially the same. The elements are arranged such that the attempted duplication results in the formation of a readily apparent warning image on the face of the document. Specifically, when an attempt is made to copy the document, the word "VOID" may appear on the duplicate document. Further, the security image elements and the complementary security image elements are arranged such that the presence of the security image and the security image elements is not readily apparent on the original. Examples of security documents of this type are illustrated in U.S. Pat. Nos. 4,579,370, 5,149,140, 5,197,765, 5,340,159, the disclosures of which are incorporated herein by reference.

The above-described prior art provides a means by which a person charged with the responsibility of reviewing security documents can identify documents that are unauthorized copies of the original security document. Unfortunately, a security document designer utilizing conventional darkroom screening techniques or conventional digital technology to produce security documents including security image elements and complementary security image elements has relatively limited control over the security image. Specifically, there is little the designer can do to influence the regular and repetitive shape, size, placement, angular orientation, and spacing of the image elements utilizing the conventional production methods. The ability to control these factors allows a designer to enhance the performance of security documents.

Accordingly, there is a need for a security document and a method of preparing a security document wherein the image elements of the security image are positioned to minimize the appearance of regular structure, while the basic functionality of the security document is preserved.

BRIEF SUMMARY OF THE INVENTION

This need is met by the present invention wherein image elements are positioned uniformly with respect to an array of image element cells and substantially randomly with respect to the pixels within each of the image element cells, and wherein complementary image elements are positioned uniformly with respect to an array of complementary image element cells and substantially randomly with respect to the pixels within each of the complementary image element cells. The above reference to one type of conventional security document is not intended to limit the scope or application of the present invention to a specific type of security document. Rather, for the purposes of defining and describing the present invention, it should be understood that security image elements and complementary security image elements according to the present invention are any printed elements that function to provide an indication that an attempt has been made to duplicate or reproduce an original security document. The attempted duplication or reproduction could be through conventional or state of the art photocopying methods (analog, digital, color, black-and-white, etc.), printing methods (ink jet, laser, etc.), publishing methods, etc.

In accordance with one embodiment of the present invention, a method of preparing a security document is provided comprising the steps of: (i) designating a security image area on the face of a document; (ii) dividing the security image area into a plurality of image element cells, such that the image element cells define an array of image element cells across the security image area; (iii) dividing each of the image element cells into a plurality of pixels, such that each image element cell defines a cell pixel array; (iv) establishing a set of active image element cells, wherein the set of active image element cells defines a security image; (v) positioning a pixel cluster within each of the active image element cells such that at least a portion of the pixel cluster is positioned within the active image element cell, wherein the position of the pixel cluster within each of the active image element cells is designated on a substantially random basis, and wherein each of the pixel clusters defines a predetermined image element; (vi) establishing a complementary security image within the security image area, wherein the complementary security image is formed by a set of predetermined complementary image elements; and (vii) printing a security document including printed areas corresponding to the predetermined image elements and the complementary image elements.

The step of positioning the pixel cluster may further comprise the steps of: determining a separation distance between the pixel cluster and each adjacent pixel cluster; comparing the separation distance to a predetermined minimum separation value; and repositioning either the pixel cluster, the adjacent pixel clusters, or both, on a substantially random basis if the separation distance is less than the predetermined minimum separation value. The step of repositioning may comprise repositioning the pixel cluster on a substantially random basis if the separation distance is less than the predetermined minimum separation value.

The dimensions of the pixels may correspond to the resolution of an imager utilized in the printing step. For example, the resolution of the imager may be approximately 5080 dpi and each of the plurality of pixels may be approximately a 1/5080" square.

The active image element cells may define a warning term. The predetermined image element may be selected from a group consisting of a dot, a square, a line, a circle, a star, a character, a word, a logo, and any other geometrical shape, or clusters of geometrical shapes, suitable for the construction of a security image.

The complementary security image portion preferably occupies a portion of the security image area not occupied by the security image. Alternatively, the security image and the complementary security image may occupy common portions of the security image area. The complementary security image may surround the security image. Alternatively, the complementary security image and the security image area may combine to bound the security image.

The complementary security image may be established by: (i) dividing the security image area into a plurality of complementary image element cells, such that the complementary image element cells define an array of complementary image element cells across the security image area; (ii) dividing each of the complementary image element cells into a plurality of pixels, such that each complementary image element cell defines a complementary cell pixel array; (iii) establishing a set of active complementary image element cells, wherein the set of active complementary image element cells defines the complementary security image; and (iv) positioning a complementary pixel cluster within each of the active complementary image element cells such that at least a portion of the complementary pixel cluster is positioned within the active complementary image element cell, wherein the position of the complementary pixel cluster within each of the active complementary image element cells is designated on a substantially random basis, and wherein each of the complementary pixel clusters defines a predetermined complementary image element.

The step of positioning the complementary pixel cluster may further comprise the steps of: (i) determining a separation distance between the complementary pixel cluster and each adjacent complementary pixel cluster; (ii) comparing the separation distance to a predetermined complementary pixel minimum separation value; and (iii) repositioning either the complementary pixel cluster, one of the adjacent complementary pixel clusters, or both, on a substantially random basis if the separation distance is less than the predetermined minimum separation value. The complementary image element may be any geometrical shape or clusters of geometrical shapes suitable for the construction of a security image.

In accordance with another embodiment of the present invention, a primary image element pixel may be designated within each of the active image element cells and its position within each of the active image element cells may be designated on a substantially random basis. Respective pixel clusters may then be constructed as a function of the respective positions of the primary image element pixels, wherein each of the pixel clusters defines a predetermined image element.

In accordance with yet another embodiment of the present invention, a security document is provided comprising a security image area on the face of the document, a printed security image within the security image area, and a printed complementary security image within the security image area. The security image area is divided into a plurality of image element cells such that the image element cells define an array of image element cells across the security image area. Each of the image element cells is divided into a plurality of pixels such that each image element cell defines a cell pixel array. The printed security image comprises printed pixel clusters within respective ones of a set of active image element cells such that at least a portion of each printed pixel cluster is positioned within respective active image element cells. Each of the printed pixel clusters defines a predetermined image element. The set of active image element cells defines the security image. The printed pixel clusters are positioned within each of the active image element cells on a substantially random basis. Similarly, the printed complementary security image comprises a set of predetermined complementary image elements.

Adjacent pixel clusters are preferably positioned such that they are separated by at least a predetermined minimum separation value. The image element cells preferably have equal dimensions and each of the pixels preferably have equal dimensions. The dimensions of the pixels preferably correspond to the resolution of an imager utilized to produce the security document.

The security image area may also be divided into a plurality of complementary image element cells, such that the complementary image element cells define an array of complementary image element cells across the security image area. Each of the complementary image element cells may be divided into a plurality of pixels, such that each complementary image element cell defines a cell pixel array. The printed complementary security image may comprise printed complementary pixel clusters within respective ones of a set of active complementary image element cells such that at least a portion of each printed complementary pixel cluster is positioned within respective active complementary image element cells. Each of the printed complementary pixel clusters preferably defines a predetermined complementary image element and the set of active complementary image element cells preferably defines the complementary security image. The printed complementary pixel clusters are positioned within each of the complementary active image element cells on a substantially random basis. Adjacent complementary pixel clusters are positioned such that they are separated by at least a predetermined minimum separation value.

According to yet another embodiment of the present invention, a security document is provided comprising: a security image area on the face of the document and a printed security image within the security image area. At least a portion of the security image area is divided into a plurality of image element cells, such that the image element cells define an array of image element cells across the security image area. Each of the image element cells is divided into a plurality of pixels, such that each image element cell defines a cell pixel array. At least a portion of the security image area is divided into a plurality of complementary image element cells, such that the complementary image element cells define an array of complementary image element cells across the security image area. Each of the complementary image element cells is divided into a plurality of pixels, such that each complementary image element cell defines a cell pixel array. The printed security image comprises image elements and complementary image elements. The image elements are positioned uniformly with respect to the array of image element cells and substantially randomly with respect to the pixels within each of the image element cells. The complementary image elements are positioned uniformly with respect to the array of complementary image element cells and substantially randomly with respect to the pixels within each of the complementary image element cells.

According to yet another embodiment of the present invention, a security document processing system is provided comprising a document issuing station, at least one document receiving station, and a security document according to the present invention.

Accordingly, it is an object of the present invention to ensure a nominally uniformly defined tone over the security image area of a security document while providing irregular placement of the image elements of the security image to minimize the appearance of regular structure. It is a further object of the present invention to give a security document designer unprecedented means to control image element shape, size, placement, angular orientation, distance to nearest neighbor, and the white space surrounding any individual image element. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

For the purposes of describing and defining the present invention, it should be understood that a security document is a document including a feature or characteristic designed or arranged to prevent successful unauthorized duplication of the document, typically by providing an indication of such on the duplicate itself. The indication of an attempted duplication may be such that it is apparent to the naked eye or such that it is apparent through the use of an optical scanner, special viewing optics, special detection hardware, etc.

Figure 1:
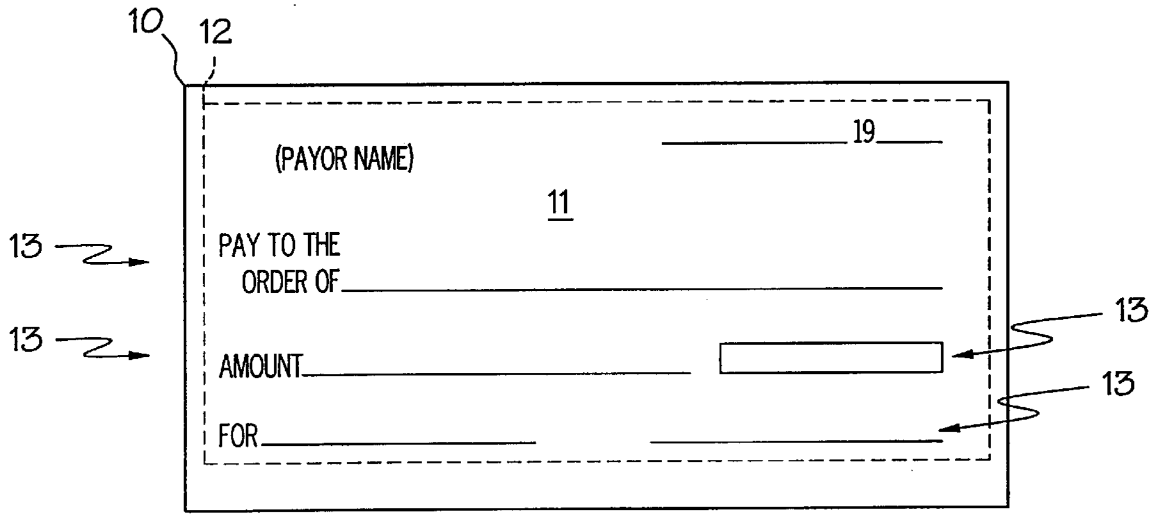
FIG. 1 is a schematic illustration of a security document according to the present invention.

The security document of the present invention, and its method of preparation, are illustrated in detail herein with reference to FIGS. 1–7, where like structure is indicated with like reference numerals. A security document 10 according to the present invention is prepared by designating a security image area 12 on the face 11 of the document 10, see FIG. 7, step 100. FIG. 1 illustrates the typical positioning of the security image area 12 on the face of the security document 10. It is contemplated by the present invention, however, that the security image area 12 can be arranged to occupy the entire face 11 of the document 10 or merely a specific portion of the face 11 of the document 10. Preferably, the security image area 12 occupies at least the portions of the face 11 dedicated to security data 13, e.g., payor, payee, amount, authorized signature, etc.

Figure 2:
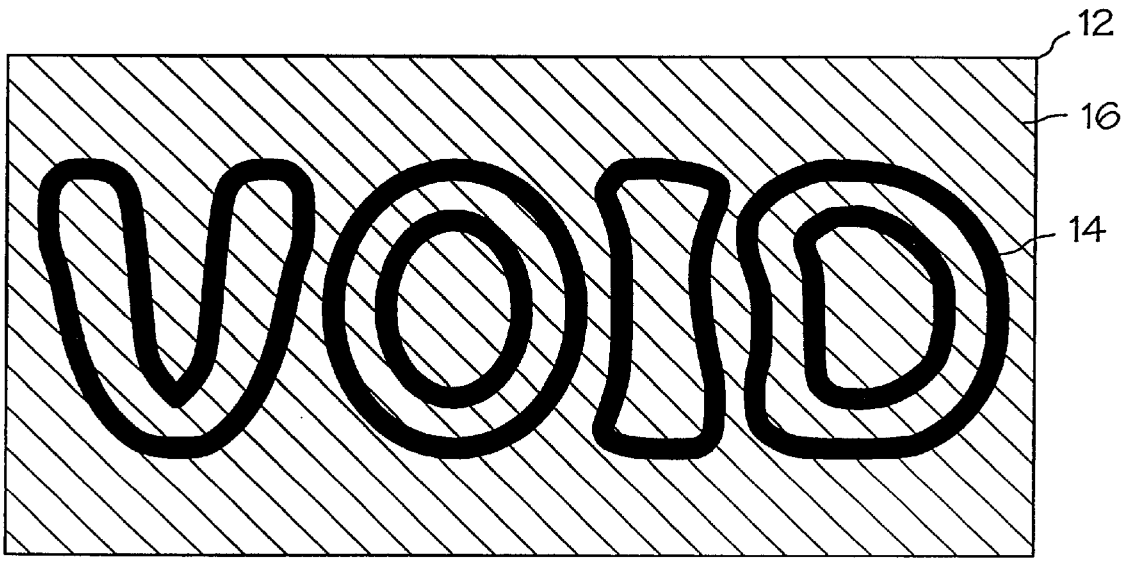
FIG. 2 is a schematic illustration of a security image area according to the present invention.

One example of the content of the security image area 12, according to the present invention is illustrated schematically in FIG. 2 and includes a printed security image 14, represented schematically by the solid lines forming the single "VOID" warning term in FIG. 2, and a printed complementary security image 16, represented schematically by the diagonal lines in FIG. 2. Typically, the complementary security image 16 occupies the portion of the security image area 12 not occupied by the security image 14. However, it is contemplated by the present invention that the security image 14 and the complementary security image 16 may overlap or occupy common portions of the security image area 12. As will be appreciated by those practicing the present invention, the hidden message technology of the present invention requires the utilization of security images and complementary security images that look very much alike to the ordinary observer. Any one of a number of readily available page assembly and drawing programs may be utilized to design the documents of the present invention, e.g., FreeHand 7.0.2, available from Macromedia, Inc., San Francisco, Calif.

It is noted that the present invention is not limited to the single "VOID" arrangement illustrated in FIG. 2 and that the specific content of the security image may vary within the scope of the present invention. For example, U.S. Pat. Nos. 4,341,404, 4,420,175, 4,579,370, 5,149,140, 5,197,765, 5,340,159, the disclosures of which are incorporated herein by reference, illustrate other possible security image arrangements that may be incorporated into the present invention.

Figure 3:
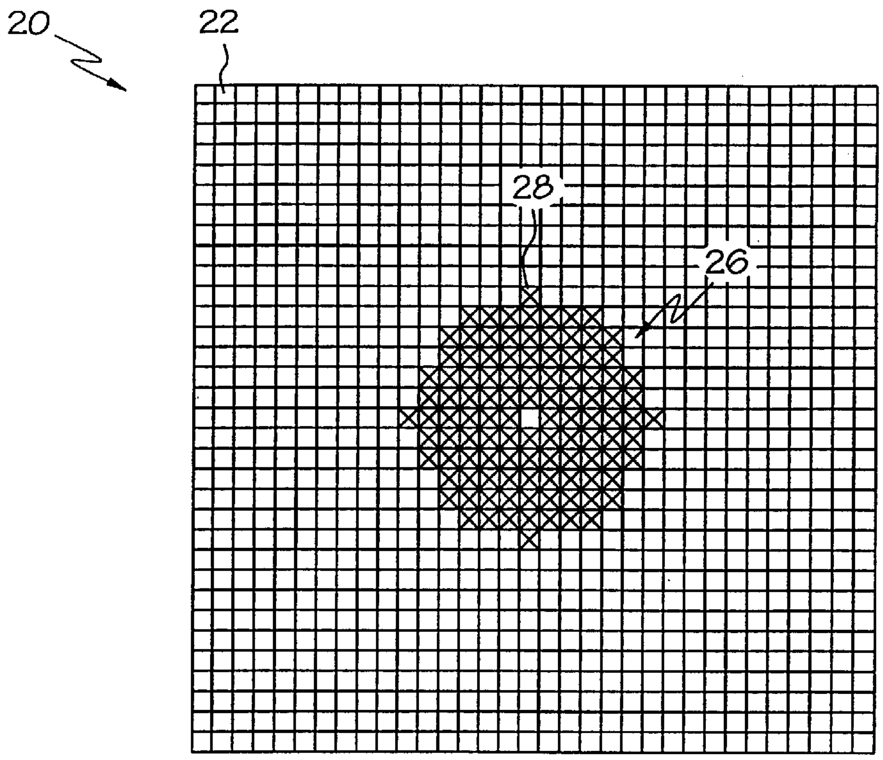
FIG. 3 is a schematic illustration of an image element cell according to the present invention.
Figure 4:
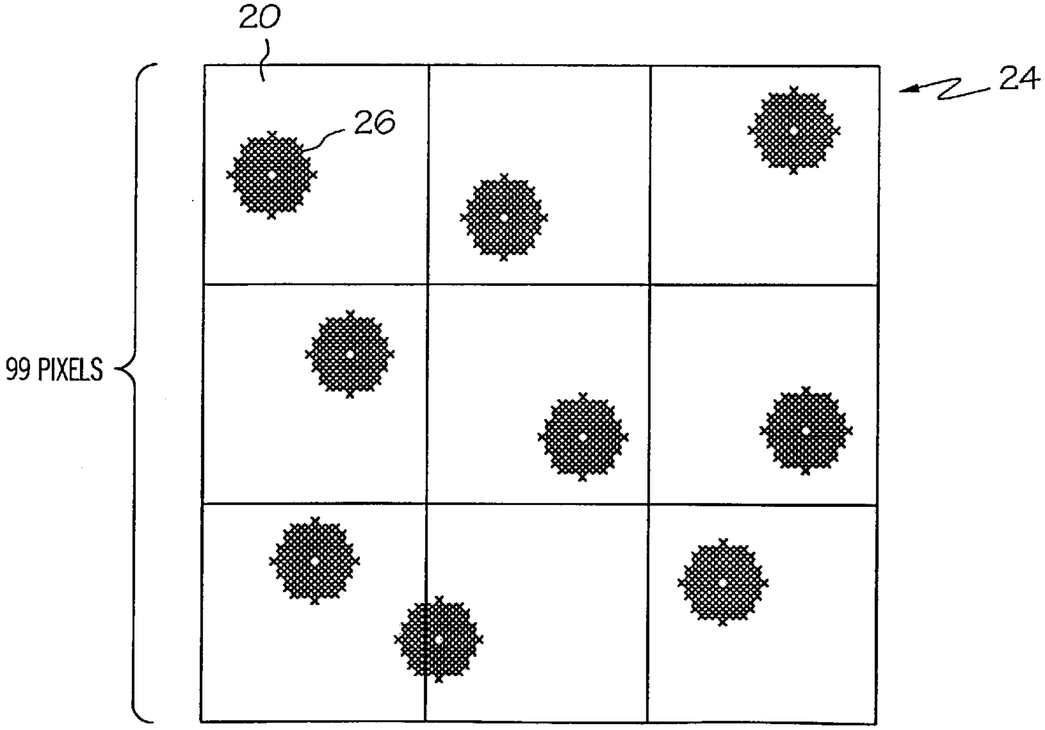
FIG. 4 is an illustration of a plurality of image element cells according to the present invention.
Figure 7:
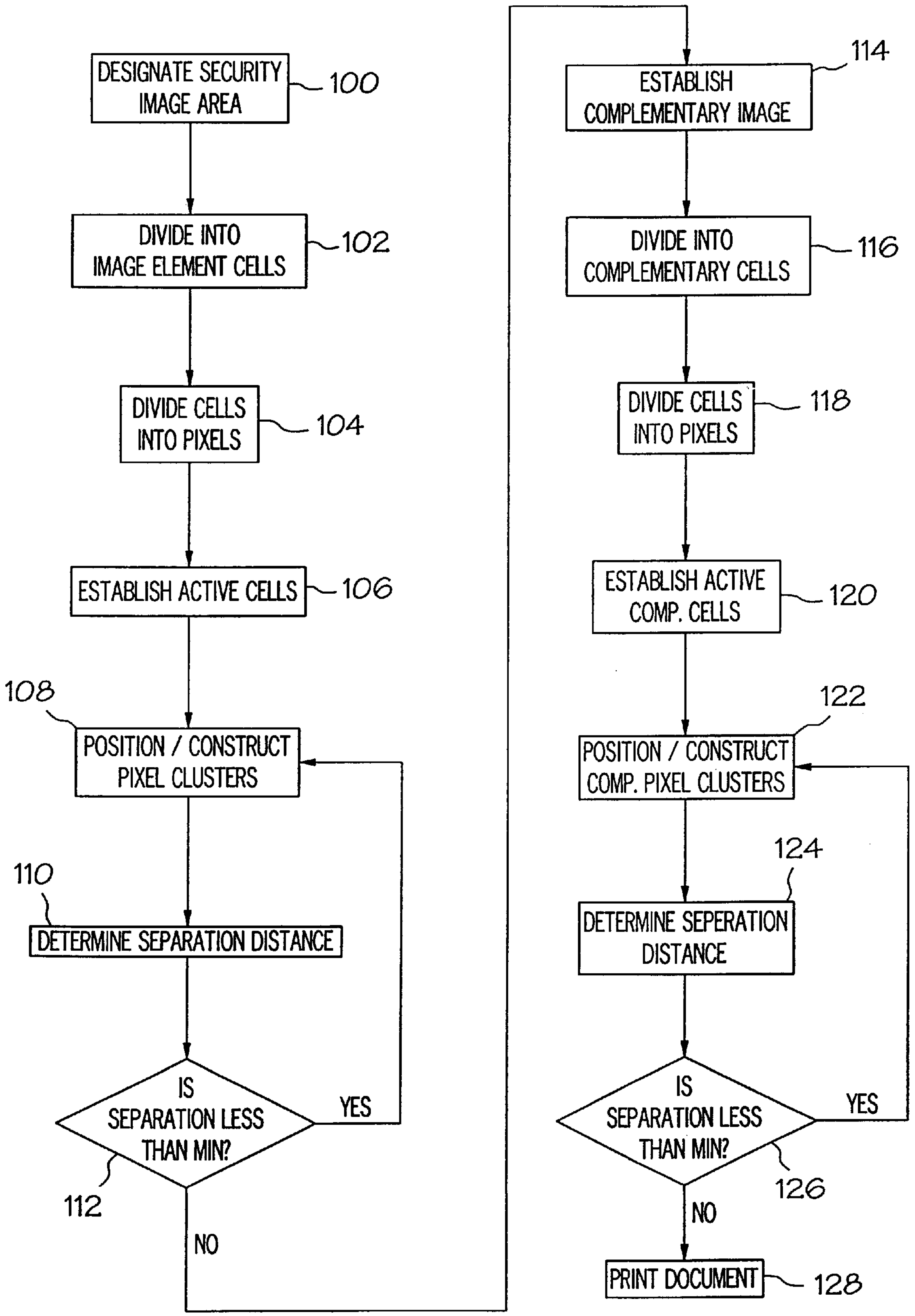
FIG. 7 is a flow chart illustrating a method of preparing a security document according to the present invention.

The security image area 12 is divided into a plurality of equally dimensioned image element cells 20 such that the image element cells 20 define an array of image element cells across the security image area 12, see FIG. 7, step 102, and FIGS. 2, 3 and 4. FIG. 3 is an illustration of a single image element cell 20 and FIG. 4 is an illustration of a plurality, i.e., nine, image element cells 20. Each of these image element cells 20 is divided into a plurality of equally dimensioned pixels 22 such that each image element cell 20 defines a cell pixel array, see FIG. 3 and FIG. 7, step 104.

To define the security image, a set of active image element cells 24, a portion of which is illustrated in FIG. 4, is established from the array of image element cells distributed across the security image area 12, see FIG. 7, step 106. For example, where the security image is the single "VOID" of FIG. 2, the set of active image element cells 24 is established such that they form the individual letters of the "VOID" image. A pixel cluster 26 is positioned within each of the active image element cells 24 such that at least a portion of the pixel cluster 26 is positioned within the boundaries of respective image element cells within the set of active image element cells 24, see FIG. 7, step 108. Each of the pixel clusters 26 defines a predetermined image element, e.g., a dot, a square, a line, a circle, a star, a character, a word, a logo, and any other geometrical shape, or clusters of geometrical shapes, suitable for the construction of a security image.

The position of the pixel cluster 26 within the respective image element cells 20 of the set of active image element cells 24 is designated on a substantially random basis. Specifically, the position of the pixel cluster 26 is initially designated on a substantially random basis but, according to one aspect of the present invention, may be repositioned if its original location violates any predetermined cluster positioning rule. For example, the separation distance between a pixel cluster and each adjacent pixel cluster may be determined and compared to a predetermined minimum separation value, see FIG. 7, step 110. If the separation distance is less than the predetermined minimum separation value, the pixel cluster is repositioned on a substantially random basis, see FIG. 7, step 112. Alternatively, it is contemplated by the present invention that one of the adjacent pixel clusters could be repositioned on a substantially random basis to increase the separation distance. According to one embodiment of the present invention, the minimum separation value is selected such that the centroids of the adjacent pixel clusters are separated from each other by at least about 25 to 50 pixels, where each of the plurality of pixels comprises a square having 1/5080" sides. Preferably, the center of each pixel cluster 26 is within the boundary of the active image element cell 24 and the pixel cluster 26 is permitted to extend outside the cell 24.

Figure 5:
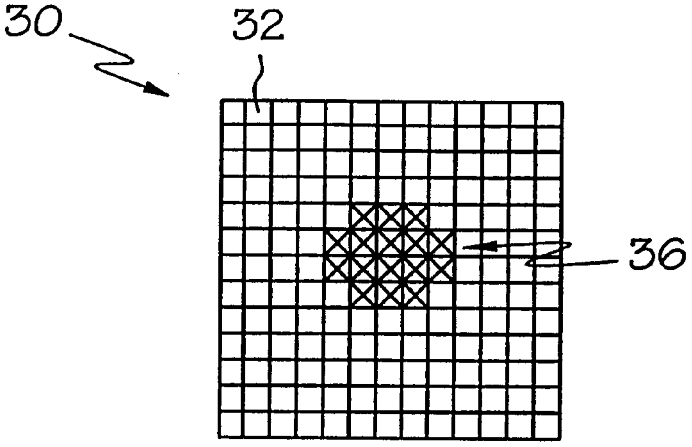
FIG. 5 is a schematic illustration of a complementary image element cell according to the present invention.
Figure 6:
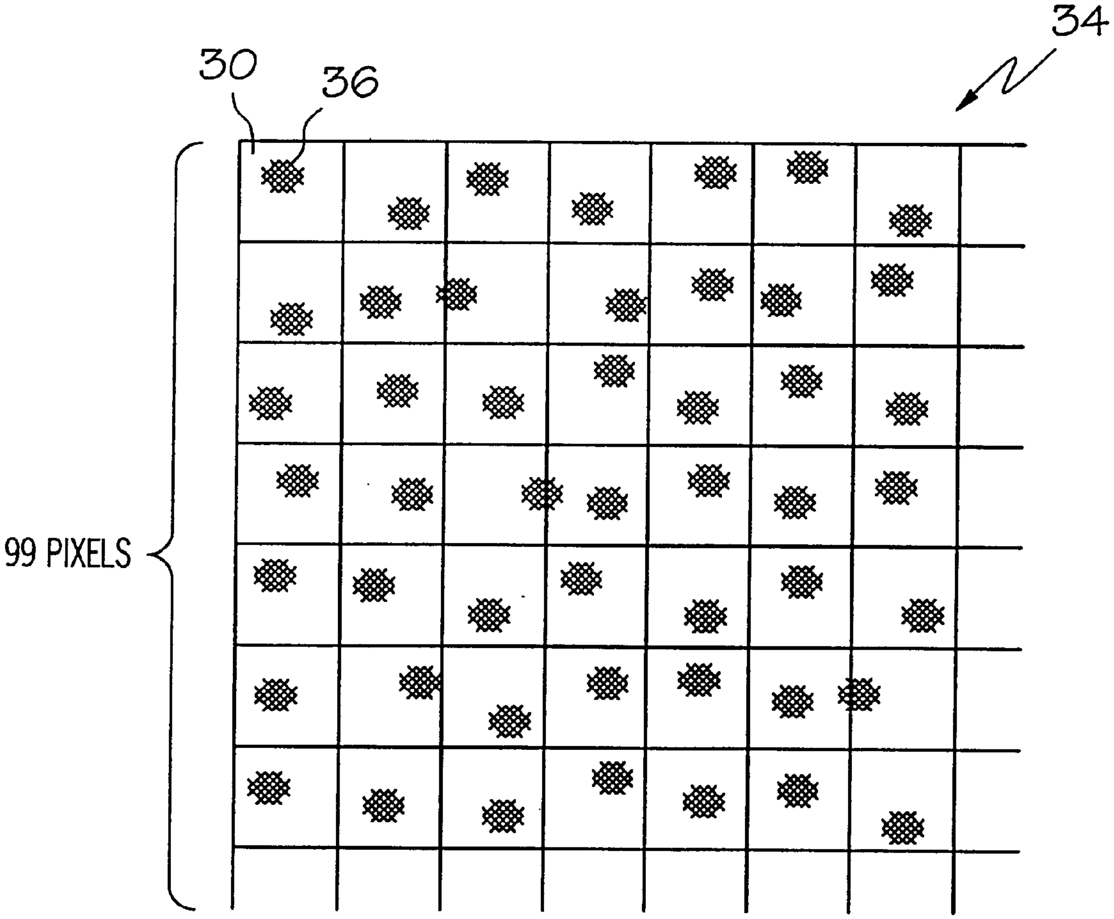
FIG. 6 is an illustration of a plurality of complementary image element cells according to the present invention.

The printed complementary security image 16, represented schematically by the diagonal lines in FIG. 2, is formed by a set of predetermined complementary image elements defined by complementary pixel clusters 36, see FIGS. 5 and 6. Each of the complementary pixel clusters 36 defines a predetermined complementary image element selected, for example, from a group consisting of a dot, a square, a line, a circle, a star, a character, a word, a logo, and any other geometrical shape, or clusters of geometrical shapes, suitable for the construction of a security image.

The printed complementary security image 16 is established in substantially the same manner as the printed security image 14. Specifically, the security image area 12 is divided into a plurality of equally dimensioned complementary image element cells 30 such that the complementary image element cells 30 define an array of complementary image element cells across the security image area 12, see FIG. 7, steps 114, 116. Each of the complementary image element cells 30 is divided into a plurality of equally dimensioned complementary pixels 32 such that each complementary image element cell 30 defines a complementary cell pixel array, see FIG. 7, step 118. A set of active complementary image element cells 34 is established to define the complementary security image 16 of FIG. 2, see FIG. 7, step 120. One complementary pixel cluster 36 is positioned within each of the active complementary image element cells 34 such that at least a portion of the complementary pixel cluster 36 is positioned within the respective active complementary image element cell 34, see FIG. 7, step 122.

The position of the complementary pixel cluster 36 within each of the active complementary image element cells is designated on a substantially random basis, as described above with respect to the substantially random positioning of the pixel cluster 26. Specifically, the position of the complementary pixel cluster 26 is initially designated on a substantially random basis but, according to one aspect of the present invention, may be repositioned if its original location violates any predetermined cluster positioning rule. For example, the separation distance between a complementary pixel cluster and each adjacent complementary pixel cluster may be determined and compared to a predetermined minimum separation value, see FIG. 7, step 124. If the separation distance is less than the predetermined minimum separation value, the complementary pixel cluster 36 is repositioned on a substantially random basis and printed, see FIG. 7, steps 126 and 128.

Referring now to FIG. 4 and FIG. 6, the relative dimensions of the image element cells 20 and the complementary image element cells 30 are illustrated. Specifically, FIGS. 4 and 6 each illustrate the number of element cells 20, 30 occupying a 99×99 pixel portion of the security image area 12. In FIG. 4, a total of 9 image element cells 20 occupy the 99×99 pixel area. In FIG. 6, 49 whole and an additional 15 partial complementary image element cells 30 occupy the 99×99 pixel area. The individual pixels 22 of the image element cells 20 have the same dimensions as the individual pixels 32 of the complementary image element cells 30. Preferably, the dimensions of the individual pixels correspond to the resolution of an imager utilized to print the security document 10. For example, where the resolution of the imager is approximately 5080 dpi, each of the plurality of pixels comprises a square having approximately 1/5080" sides.

As is illustrated by FIGS. 4 and 6, the image elements, i.e., the respective pixel clusters 26, are positioned uniformly with respect to the array of image element cells 20 as a whole and substantially randomly with respect to the pixels 22 within each of the image element cells 20. Specifically, the position of each image element 26 is random in the sense that it need not occupy a precise set of pixels 22 within the corresponding active image element cell 24, and is uniform, or non-random, in the sense that its position is anchored to its corresponding active image element cell 24. Similarly, the complementary image elements, i.e., the respective complementary pixel clusters 26, are positioned uniformly with respect to the array of complementary image element cells 30 as a whole and substantially randomly with respect to the pixels 32 within each of the complementary image element cells 30. Specifically, the position of each complementary image element 36 is random in the sense that it need not occupy a precise set of pixels 32 within the corresponding active complementary image element cell 34, and is uniform, or non-random, in the sense that its position is anchored to its corresponding active complementary image element cell 34. Thus, the security document of the present invention is said to embody a pseudo-random security image.

It is contemplated that, as an alternative to positioning an entire pixel cluster 26 within an active image element cell 24 and determining the separation distance between adjacent pixel clusters 26, a primary image element pixel 28 may be designated within each active image element cell 24. Subsequently, the separation distance between primary image element pixels 28 of adjacent cells may be compared to the minimum separation value and, if necessary, the position of the primary image element pixel 28 may be redesignated. The respective pixel clusters 26 may then be constructed as a function of the respective positions of the primary image element pixels 28.

The pixel clusters 26 and the complementary pixel clusters of the present invention are preferably constructed and positioned utilizing a computer program applied in an appropriate manner to produce data files, e.g., TIFF files, preferably at the native resolutions of the imagers of choice, e.g., 3048 dpi and 5080 dpi. The program allows designation of the number of image elements, i.e., pixel clusters, required to give a chosen tonal value. Preferably, the placement of the image elements is controlled or varied to avoid the appearance of regularity without allowing the uneven distributions sometimes associated with randomness. The resulting image element positions give uniform tone without the geometric regularity of conventional halftones. It is contemplated by the present invention that the image elements described herein may be positioned to provide graded or varying tones across the security image area and may be positioned manually, without the aid of an automated cluster positioning program.

Preferably, all elements from the three standard security image layers, i.e., security image, complementary security image, and camouflage image, are combined into a single image defined at the native resolution of the imager and converted into a high resolution bitmap file. The image may be converted to TIFF format and used as a stock illustration for creation of numerous individual job files. In this manner, the high resolution images may be stored on an imager system and called for inclusion into various jobs at the final printing or output step. TIFF is a widely accepted file format for storing and interchanging raster images and has been incorporated into the American National Standards Institute Tag Image File Format for Image Technology (TIFF/IT)

standard (ANSI IT 8.8). Most commercially available and widely accepted graphics software packages support TIFF files via "import" (input) and/or "export" (output) functions. The TIFF format provides definition for both color and monochrome images in conventional use. It is contemplated by the present invention, that any one of a variety of techniques may be utilized to combine the three standard security image layers. One such procedure is illustrated in the computer program illustrated in the source code reproduced in the Microfiche Appendix hereto.

The image generation procedure of the present invention enables definition of precise patterns in terms of specific pixels of the high resolution imager and use of these patterns to create high resolution files. The resulting output image is completely "dot addressable" at the resolution of the imaging engine.

For the purpose of describing the procedure of the present invention, it is noted that the "image element" is a two-dimensional pattern of control bits that can be defined in shapes that utilize the potential of the high resolution imager. Each control bit has one of two states, "set" or "clear," and will control one spot of the laser imaging device when operating at the native resolution of the imager. The image element has no inherent resolution. Thus the number of the laser spots controlled by each control bit depends upon the resolution and image size defined in the image file and the native resolution of the imager. For maximum image control and fidelity of the reproduction to the original, the file resolution should match that of the targeted imagesetter.

Image file generation is controlled by the following parameters: (i) image resolution, (ii) image size, (iii) image element shape, (iv) percent of area covered, and (v) the adjacency rule. The resolution of the image is often described in dots per inch (dpi). On laser film recorders these precisely placed marks may also be described as laser spots per inch. For maximum image control, the mark frequency should correspond to the highest resolution of the imaging device in dots or laser spots per inch. It is usual to have the same mark frequency in both dimensions of the two dimensional image. The image size is specified as the number of dots across the image (width) and the number of dots down the image (height). The usual image dimensions in linear values can be determined by dividing the image dimensions in dots by the resolution in dots per conventional linear measure (inches, centimeters, etc.). The image element shape is the elemental cluster of laser spots that is repeated and positioned to fill a specified area. This cluster may be round, square, solid, open, perhaps with irregular boundaries, etc. It will remain consistent over an arbitrarily defined area that may be very large or very small depending on the design intent for the image. The percent of area covered is defined as the total number of imaged (on) dots divided by the total number of dots in the image area×100. This approach allows the mixing of different image elements in the same area and computing the percent of area covered by all the image elements of a specific type or the percent of area covered by all elements of all types. The closeness of placement of adjacent image elements is controlled by specifying the minimum number of dots that must separate nearest neighbor elements. This prevents clustering of many image elements together to produce larger image elements and assures a nearly uniform tone for the image area.

Each control bit in the image element determines whether the corresponding dot on the imager should be on or off. As a result there are only two states—either set or clear. The total number of imaged dots needed is determined by multiplying the decimal percent of area covered that is desired by the total number of dots in the image area. The image element patterns are examined to determine the number of "set" bits in each image element. The total number of image element cells are determined by dividing the total number of laser spot addresses in the area of interest by the number of "on" bits per image element. The length and width of the image area is computed in terms of image element cells as described above.

For example, suppose the total image size is 6.0 inches wide by 3 inches high, the imager resolution is 5080 spots per inch, the target coverage by the particular pattern for the security image layer is 10%, and the image element cells include 33×33 or 1089 total pixels (see FIG. 4):

$$6.0\times5080\times3.0\times5080=464{,}515{,}200 \text{ laser spot addresses}$$

$464{,}515{,}200\times0.10=46{,}451{,}520$ laser spots "on" to give 10% of the total laser spot addresses an "on" value.

Our image element has 109 "set" spots per each image element (10% of 1089).

$$46{,}451{,}520/109=426{,}160 \text{ total image element cells}$$

Since the length of the document is twice the width (6"×3"), we compute the number of cells along the 6" length and 3" width as follows:

c=the number of cells along the 3" width and

2c=the number of cells along the 6" length.

$2c\times1c=2c^2=426{,}160$ cells "on" total c=462 and 2c=924

If we were using standard uniformly positioned, single size image elements, we would likely say that this array of cells is about a 154 line screen:

$$462 \text{ cells}/3 \text{ inches}=154 \text{ cells/inch}$$

$$924 \text{ cells}/6 \text{ inches}=154 \text{ cells/inch.}$$

The resulting cells contain about 1089 addresses within the boundaries of the cell created in response to the required percent of area covered:

$$5080/154=32.987 \text{ or about } 33$$

$$33^2=1089 \text{ laser spots per cell.}$$

Note that the cell size changes with the specified percent of area covered to permit different average placement of the given image element. In cases where rounding produces fractional cell sizes measured in laser spots, the procedure tracks the discrepancies and introduces a whole bit as needed to round the cells to integral values. This insures filling the total image area.

Cell size, image element size, and percent of area covered, which strongly influences cell size, can all converge on values that severely limit image element placement or force element overlap or collision. Preferably, the program according to the present invention is designed to generate warnings for these unacceptable conditions.

It is contemplated by the present invention that the total image area, i.e., the security image area 12 of FIGS. 1 and 2, may occupy only a portion of a face of a security document and that the image area may be reproduced or "tiled" to occupy substantially the entire face of the security document. Such a "tiling" method would decrease the amount of computer memory required to create, modify, and otherwise process the pseudo-random image of the present invention and would likely decrease the time required to design a security document containing a pseudo-random image of the present invention.

It is contemplated by the present invention that additional images of different cell sizes including additional image elements may be defined. These arrays can be set to cover the same image area. Preferably, rules are established that take into account the previously placed image elements and their "set" bits as well as the new ones to be placed, and permit the mixing of image elements of different sizes and shapes in the same area of interest. In principle, such a procedure can be repeated an arbitrary number of times to introduce numerous arrays of different size and shape image elements into the same image area. As will be appreciated by those practicing the present invention, the multiple array procedure works best with relatively light coverage resulting from fairly large spaces between image elements.

Having described the invention in detail and by reference to preferred embodiments thereof, it will be apparent that modifications and variations are possible without departing from the scope of the invention defined in the appended claims.

What is claimed is:

1. A method of preparing a security document comprising the steps of:

designating a security image area on the face of a document;

dividing said security image area into a plurality of image element cells, such that said image element cells define an array of image element cells across said security image area;

dividing each of said image element cells into a plurality of pixels, such that each image element cell defines a cell pixel array;

establishing a set of active image element cells, wherein said set of active image element cells defines a security image;

positioning a pixel cluster within each of said active image element cells such that at least a portion of said pixel cluster is positioned within said active image element cell, wherein the position of said pixel cluster within each of said active image element cells is designated on a substantially random basis, and wherein each of said pixel clusters defines a predetermined image element;

establishing a complementary security image within said security image area, wherein said complementary security image is formed by a set of predetermined complementary image elements; and printing a security document including printed areas corresponding to said predetermined image elements and said complementary image elements.

2. A method of preparing a security document as claimed in claim 1 wherein said step of positioning said pixel cluster further comprises the steps of:

determining a separation distance between said pixel cluster and each adjacent pixel cluster;

comparing said separation distance to a predetermined minimum separation value; and repositioning at least one of said pixel cluster and said adjacent pixel clusters on a substantially random basis where said separation distance is less than said predetermined minimum separation value.

3. A method of preparing a security document as claimed in claim 2 wherein said step of repositioning comprises repositioning said pixel cluster on a substantially random basis.

4. A method of preparing a security document as claimed in claim 2 wherein said step of repositioning comprises repositioning one of said adjacent pixel clusters on a substantially random basis.

5. A method of preparing a security document as claimed in claim 1 wherein said image element cells have equal dimensions.

6. A method of preparing a security document as claimed in claim 1 wherein each of said pixels have equal dimensions.

7. A method of preparing a security document as claimed in claim 1 wherein the dimensions of said pixels correspond to the resolution of an imager utilized in said printing step.

8. A method of preparing a security document as claimed in claim 1 wherein the resolution of said imager is at least approximately 5080 dpi and wherein each of said plurality of pixels has an area less than or equal to approximately a 1/5080" square.

9. A method of preparing a security document as claimed in claim 1 wherein said active image element cells define a warning term.

10. A method of preparing a security document as claimed in claim 1 wherein said predetermined image element is selected from a group consisting of a dot, a square, a line, a circle, a star, a character, a word, a logo, and any other geometrical shape, or clusters of geometrical shapes, suitable for the construction of a security image.

11. A method of preparing a security document as claimed in claim 1 wherein said complementary security image portion occupies a portion of said security image area not occupied by said security image.

12. A method of preparing a security document as claimed in claim 1 wherein said security image and said complementary security image occupy common portions of said security image area.

13. A method of preparing a security document as claimed in claim 1 wherein said complementary security image surrounds said security image.

14. A method of preparing a security document as claimed in claim 1 wherein said complementary security image and said security image area bound said security image.

15. A method of preparing a security document as claimed in claim 1 wherein said complementary security image is established by:

dividing said security image area into a plurality of complementary image element cells, such that said complementary image element cells define an array of complementary image element cells across said security image area;

dividing each of said complementary image element cells into a plurality of pixels, such that each complementary image element cell defines a complementary cell pixel array;

establishing a set of active complementary image element cells, wherein said set of active complementary image element cells defines said complementary security image; and positioning a complementary pixel cluster within each of said active complementary image element cells such that at least a portion of said complementary pixel cluster is positioned within said active complementary image element cell, wherein the position of said complementary pixel cluster within each of said active complementary image element cells is designated on a substantially random basis, and wherein each of said complementary pixel clusters defines a predetermined complementary image element.

16. A method of preparing a security document as claimed in claim 15 wherein said step of positioning said complementary pixel cluster further comprises the steps of:

determining a separation distance between said complementary pixel cluster and each adjacent complementary pixel cluster;

comparing said separation distance to a predetermined complementary pixel minimum separation value; and repositioning at least one of said complementary pixel cluster and said adjacent complementary pixel clusters on a substantially random basis where said separation distance is less than said predetermined minimum separation value.

17. A method of preparing a security document as claimed in claim 15 wherein said complementary image element is selected from a group consisting of a dot, a square, a line, a circle, a star, a character, a word, a logo, and any other geometrical shape, or clusters of geometrical shapes, suitable for the construction of a security image.

18. A method of preparing a security document as claimed in claim 15 wherein said image element cells have different dimensions than said complementary image element cells.

19. A method of preparing a security document as claimed in claim 15 wherein said image element cells have different dimensions than said complementary image element cells and wherein said pixels of said image element cells have the same dimensions as said pixels of said complementary image element cells.

20. A method of preparing a security document comprising the steps of:

designating a security image area on the face of a document;

dividing said security image area into a plurality of image element cells, such that said image element cells define an array of image element cells across said security image area;

dividing each of said image element cells into a plurality of pixels, such that each image element cell defines a cell pixel array;

establishing a set of active image element cells, wherein said set of active image element cells defines a security image;

designating a primary image element pixel within each of said active image element cells, wherein the position of said primary image element pixel within each of said active image element cells is designated on a substantially random basis;

constructing respective pixel clusters as a function of the respective positions of said primary image element pixels, wherein each of said pixel clusters defines a predetermined image element;

establishing a complementary security image within said security image area, wherein said complementary security image is formed by a set of predetermined complementary image elements; and printing a security document including printed areas corresponding to said predetermined image elements and said complementary image elements.

21. A method of preparing a security document as claimed in claim 20 wherein said step of designating said primary image element pixel within each of said active image element cells further comprises the steps of:

determining a separation distance between said primary image element pixel and each adjacent primary image element pixel;

comparing said separation distance to a predetermined minimum separation value; and redesignating at least one of said primary image element pixel and said adjacent primary image element pixels within said active image element cell on a substantially random basis where said separation distance is less than said predetermined minimum separation value.

22. A method of preparing a security document as claimed in claim 21 wherein said primary image element pixel is redesignated within said active image element cell on a substantially random basis where said separation distance is less than said predetermined minimum separation value.

23. A method of preparing a security document as claimed in claim 20 wherein said primary image element pixel is included within said pixel cluster.

24. A method of preparing a security document as claimed in claim 20 wherein said complementary security image is established by:

dividing said security image area into a plurality of complementary image element cells, such that said complementary image element cells define an array of complementary image element cells across said security image area;

dividing each of said complementary image element cells into a plurality of pixels, such that each complementary image element cell defines a complementary cell pixel array;

establishing a set of active complementary image element cells, wherein said set of active complementary image element cells defines said complementary security image;

designating a primary complementary image element pixel within each of said active complementary image element cells, wherein the position of said primary complementary image element pixel within each of said active complementary image element cells is designated on a substantially random basis; and constructing respective complementary pixel clusters as a function of the respective positions of said primary complementary image element pixels, wherein each of said complementary pixel clusters defines said predetermined complementary image element.

25. A method of preparing a security document as claimed in claim 24 wherein said step of designating said primary complementary image element pixel within each of said active complementary image element cells further comprises the steps of:

determining a separation distance between said primary complementary image element pixel and an adjacent primary complementary image element pixel;

comparing said separation distance to a predetermined minimum separation value; and redesignating at least one of said primary complementary image element pixel and said adjacent primary complementary image element pixels within said active complementary image element cell on a substantially random basis where said separation distance is less than said predetermined minimum separation value.

26. A security document comprising:

a security image area on the face of said document, wherein said security image area is divided into a plurality of image element cells, such that said image element cells define an array of image element cells across said security image area, and wherein each of said image element cells is divided into a plurality of pixels, such that each image element cell defines a cell pixel array;

a printed security image within said security image area, wherein said printed security image comprises printed pixel clusters within respective ones of a set of active image element cells such that at least a portion of each printed pixel cluster is positioned within respective active image element cells, wherein each of said printed pixel clusters defines a predetermined image element, wherein said set of active image element cells defines said security image, and wherein said printed pixel clusters are positioned within each of said active image element cells on a substantially random basis; and a printed complementary security image within said security image area, wherein said printed complementary security image comprises a set of predetermined complementary image elements.

27. A security document as claimed in claim 26 wherein adjacent pixel clusters are positioned such that they are separated by at least a predetermined minimum separation value.

28. A security document as claimed in claim 26 wherein adjacent pixel clusters are positioned such that their respective centroids are separated by at least a predetermined minimum separation value.

29. A security document as claimed in claim 26 wherein said image element cells have equal dimensions.

30. A security document as claimed in claim 26 wherein each of said pixels have equal dimensions.

31. A security document as claimed in claim 26 wherein the dimensions of said pixels correspond to the resolution of an imager utilized to produce said security document.

32. A security document as claimed in claim 26 wherein the resolution of said imager is approximately 5080 dpi and wherein each of said plurality of pixels is approximately a 1/5080" square.

33. A security document as claimed in claim 26 wherein said active image element cells define a warning term.

34. A security document as claimed in claim 26 wherein said predetermined image element is selected from a group consisting of a dot, a square, a line, a circle, a star, a character, a word, a logo, and any other geometrical shape, or clusters of geometrical shapes, suitable for the construction of a security image.

35. A security document as claimed in claim 26 wherein said complementary security image portion occupies a portion of said security image area not occupied by said security image.

36. A security document as claimed in claim 26 wherein said security image and said complementary security image occupy common portions of said security image area.

37. A security document as claimed in claim 26 wherein said complementary security image surrounds said security image.

38. A security document as claimed in claim 26 wherein said complementary security image and said security image area bound said security image.

39. A security document as claimed in claim 26 wherein said security image area is divided into a plurality of complementary image element cells, such that said complementary image element cells define an array of complementary image element cells across said security image area, each of said complementary image element cells is divided into a plurality of pixels, such that each complementary image element cell defines a cell pixel array, said printed complementary security image comprises printed complementary pixel clusters within respective ones of a set of active complementary image element cells such that at least a portion of each printed complementary pixel cluster is positioned within respective active complementary image element cells, each of said printed complementary pixel clusters defines a predetermined complementary image element, said set of active complementary image element cells defines said complementary security image, and wherein said printed complementary pixel clusters are positioned within each of said complementary active image element cells on a substantially random basis.

40. A security document as claimed in claim 39 wherein adjacent complementary pixel clusters are positioned such that they are separated by at least a predetermined minimum separation value.

41. A security document as claimed in claim 39 wherein adjacent complementary pixel clusters are positioned such that their respective centroids are separated by at least a predetermined minimum separation value.

42. A security document as claimed in claim 39 wherein said complementary image element is selected from a group consisting of a dot, a square, a line, a circle, a star, a character, a word, a logo, and any other geometrical shape, or clusters of geometrical shapes, suitable for the construction of a security image.

43. A security document comprising:

a security image area on the face of the document, wherein at least a portion of said security image area is divided into a plurality of image element cells, such that said image element cells define an array of image element cells across said security image area, each of said image element cells is divided into a plurality of pixels, such that each image element cell defines a cell pixel array, at least a portion of said security image area is divided into a plurality of complementary image element cells, such that said complementary image element cells define an array of complementary image element cells across said security image area, and wherein each of said complementary image element cells is divided into a plurality of pixels, such that each complementary image element cell defines a cell pixel array; and a printed security image within said security image area, wherein said printed security image comprises image elements and complementary image elements, said image elements are positioned uniformly with respect to said array of image element cells and substantially randomly with respect to said pixels within each of said image element cells, and said complementary image elements are positioned uniformly with respect to said array of complementary image element cells and substantially randomly with respect to said pixels within each of said complementary image element cells.

44. A security document as claimed in claim 43 wherein said image elements are positioned such that they are separated by at least a predetermined minimum separation value.

45. A security document as claimed in claim 43 wherein said image elements are positioned such that their respective centroids are separated by at least a predetermined minimum separation value.

46. A security document as claimed in claim 43 wherein said complementary image elements are positioned such that they are separated by at least a predetermined minimum separation value.

47. A security document as claimed in claim 43 wherein said complementary image elements are positioned such that their respective centroids are separated by at least a predetermined minimum separation value.

48. A security document processing system comprising a document issuing station, at least one document receiving station, and a security document comprising:

a security image area on the face of the document, wherein at least a portion of said security image area is divided into a plurality of image element cells, such that said image element cells define an array of image element cells across said security image area, each of said image element cells is divided into a plurality of pixels, such that each image element cell defines a cell pixel array, at least a portion of said security image area is divided into a plurality of complementary image element cells, such that said complementary image element cells define an array of complementary image element cells across said security image area, and wherein each of said complementary image element cells is divided into a plurality of pixels, such that each complementary image element cell defines a cell pixel array; and a printed security image within said security image area, wherein said printed security image comprises image elements and complementary image elements, said image elements are positioned uniformly with respect to said array of image element cells and substantially randomly with respect to said pixels within each of said image element cells, and said complementary image elements are positioned uniformly with respect to said array of complementary image element cells and substantially randomly with respect to said pixels within each of said complementary image element cells.

* * * * *